(12) United States Patent
Liu et al.

(10) Patent No.: US 9,537,168 B2
(45) Date of Patent: Jan. 3, 2017

(54) MEMBRANE ELECTRODE ASSEMBLIES

(71) Applicant: BASF SE, Ludwigshafen (DE)

(72) Inventors: Zhenyu Liu, Edison, NJ (US); Yu-Min Tsou, Princeton, NJ (US); Emory De Castro, Nahant, MA (US)

(73) Assignee: BASF SE (DE)

( * ) Notice: Subject to any disclaimer, the term of this patent is extended or adjusted under 35 U.S.C. 154(b) by 134 days.

(21) Appl. No.: 14/525,804

(22) Filed: Oct. 28, 2014

(65) Prior Publication Data

US 2015/0118594 A1    Apr. 30, 2015

Related U.S. Application Data

(60) Provisional application No. 61/897,307, filed on Oct. 30, 2013.

(51) Int. Cl.
*H01M 8/10* (2016.01)
*H01M 4/86* (2006.01)
(Continued)

(52) U.S. Cl.
CPC ........... *H01M 8/1004* (2013.01); *H01M 4/861* (2013.01); *H01M 4/8605* (2013.01); *H01M 4/8657* (2013.01); *H01M 4/9083* (2013.01); *H01M 8/0234* (2013.01); *H01M 8/0239* (2013.01); *H01M 8/0243* (2013.01); *H01M 8/0245* (2013.01); *H01M 8/103* (2013.01); *H01M 8/1048* (2013.01); *H01M 4/926* (2013.01); *H01M 8/0236* (2013.01);
(Continued)

(58) Field of Classification Search
CPC .................. H01M 8/1004; H01M 2300/0082; H01M 8/103; H01M 2008/1095
See application file for complete search history.

(56) References Cited

U.S. PATENT DOCUMENTS

| 3,477,877 A | 11/1969 | Kordesch |
| 4,191,618 A | 3/1980 | Coker et al. |

(Continued)

FOREIGN PATENT DOCUMENTS

| DE | 195 09 748 A1 | 10/1996 |
| DE | 195 09 749 A1 | 10/1996 |

(Continued)

*Primary Examiner* — Stewart Fraser
(74) *Attorney, Agent, or Firm* — Drinker Biddle & Reath LLP

(57) ABSTRACT

The present invention relates to improved membrane electrode assemblies, having two electrochemically active electrodes separated by a polymer electrolyte membrane.
The membrane electrode assemblies according to the instant invention contains at least one phosphoric acid-containing polymer electrolyte membrane and two gas diffusion electrodes one of each located at both sides of said membrane, each of the gas diffusion electrodes having at least one catalyst layer facing towards the membrane. At least one of the gas diffusion electrodes contains a gas diffusion medium comprising an electrically conductive macroporous layer in which the pores have a mean pore diameter in the range from 10 μm to 30 μm and at least one micro porous layer arranged between said gas diffusion medium and said catalyst layer facing towards the membrane having a defined pore void volume and pore hydrophobicity measured by the Cobb Titration.

15 Claims, 6 Drawing Sheets

(51) Int. Cl.
*H01M 4/90* (2006.01)
*H01M 8/02* (2016.01)
*H01M 4/92* (2006.01)

(52) U.S. Cl.
CPC .. *H01M 8/1067* (2013.01); *H01M 2008/1095* (2013.01); *Y02E 60/521* (2013.01)

(56) References Cited

U.S. PATENT DOCUMENTS

| | | | |
|---|---|---|---|
| 4,212,714 | A | 7/1980 | Coker et al. |
| 4,333,805 | A | 6/1982 | Davidson et al. |
| 5,211,984 | A | 5/1993 | Wilson |
| 5,525,436 | A | 6/1996 | Savinell et al. |
| 5,738,905 | A | 4/1998 | Bevers |
| 5,761,793 | A | 6/1998 | Bevers et al. |
| 5,998,057 | A | 12/1999 | Koschany et al. |
| 6,017,650 | A | 1/2000 | Ramunni et al. |
| 6,103,077 | A | 8/2000 | DeMarinis et al. |
| 6,165,636 | A | 12/2000 | Giallombardo et al. |
| 6,379,834 | B1 | 4/2002 | Giallombardo et al. |
| 7,419,546 | B2 | 9/2008 | Gulla et al. |
| 7,540,984 | B2 | 6/2009 | Calundann et al. |
| 2003/0175569 | A1* | 9/2003 | Inagaki ............ C25B 9/10 429/480 |
| 2004/0075172 | A1 | 4/2004 | Bauer et al. |
| 2004/0118773 | A1 | 6/2004 | Uensal et al. |
| 2004/0127588 | A1 | 7/2004 | Calumdann et al. |
| 2004/0131909 | A1 | 7/2004 | Soczka-Guth et al. |
| 2005/0074654 | A1 | 4/2005 | Kiefer et al. |
| 2005/0118476 | A1 | 6/2005 | Melzner et al. |
| 2008/0026277 | A1 | 1/2008 | Peterson et al. |
| 2008/0057358 | A1 | 3/2008 | Calundann et al. |
| 2008/0160378 | A1 | 7/2008 | Geormezi et al. |
| 2008/0233435 | A1 | 9/2008 | Hasegawa et al. |
| 2008/0268321 | A1 | 10/2008 | Uensal et al. |
| 2008/0280182 | A1 | 11/2008 | Uensal et al. |
| 2010/0167099 | A1 | 7/2010 | Sung et al. |
| 2012/0196205 | A1* | 8/2012 | Park ............... H01M 4/8605 429/480 |

FOREIGN PATENT DOCUMENTS

| | | |
|---|---|---|
| DE | 197 57 492 A1 | 7/1999 |
| DE | 10052242 A1 | 5/2002 |
| DE | 10109829 A1 | 9/2002 |
| DE | 10110752 A1 | 9/2002 |
| DE | 10117687 A1 | 10/2002 |
| DE | 10140147 A1 | 3/2003 |
| DE | 20217178 U1 | 4/2003 |
| DE | 10245451 A1 | 4/2004 |
| DE | 10331365 A1 | 2/2005 |
| DE | 102005038195 A1 | 2/2007 |
| EP | 1379573 A1 | 1/2004 |
| EP | 1921701 A1 | 5/2008 |
| EP | 2352194 A1 | 8/2011 |
| EP | 2448047 A1 | 5/2012 |
| WO | WO-92/15121 A1 | 9/1992 |
| WO | WO-9720358 A1 | 6/1997 |
| WO | WO-00/26982 A2 | 5/2000 |
| WO | WO-00/44816 A1 | 8/2000 |
| WO | WO-01/18894 A2 | 3/2001 |
| WO | WO-2013/112360 A1 | 8/2013 |

\* cited by examiner

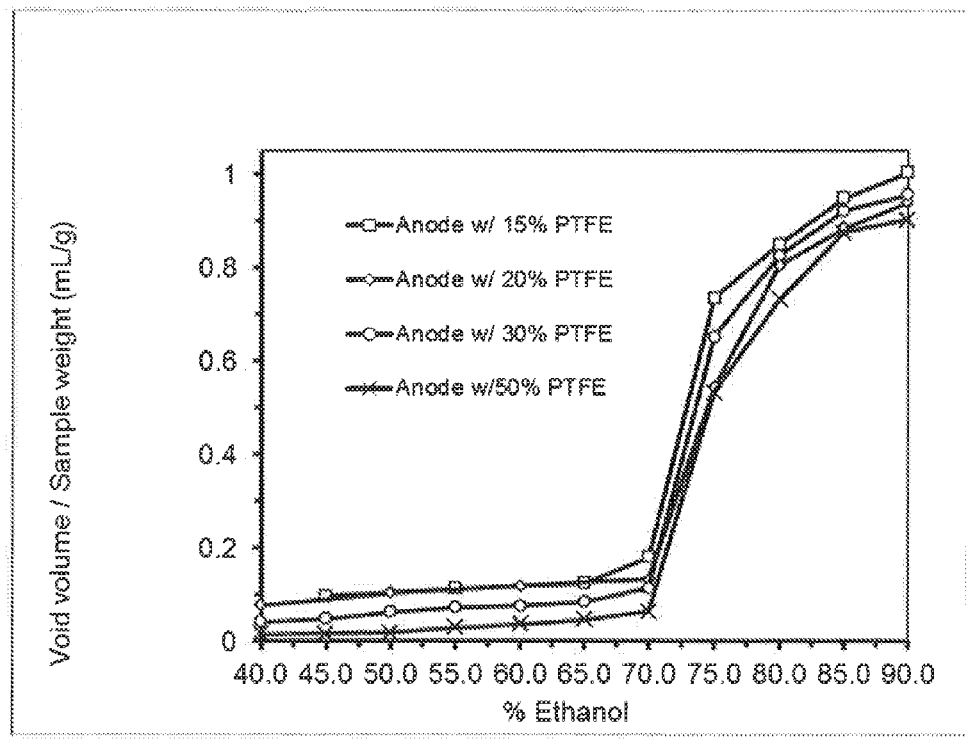
Figure 9
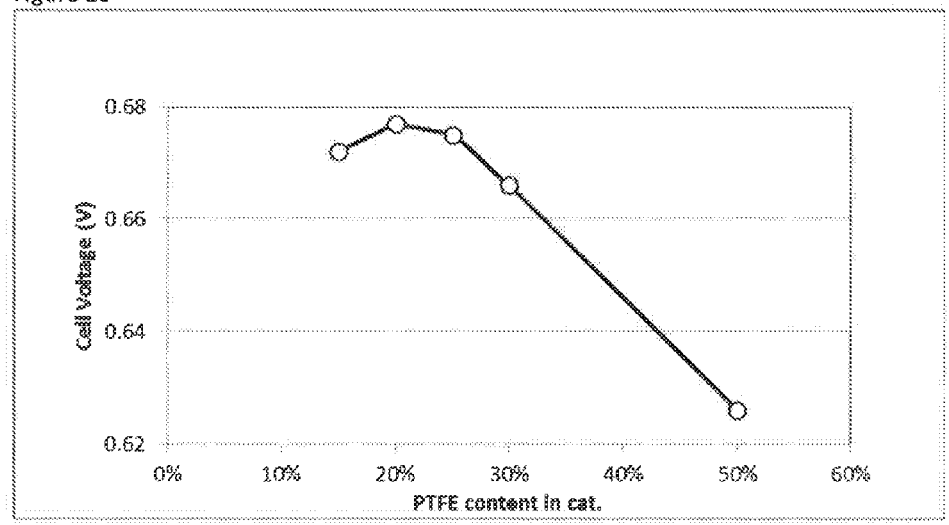

MEMBRANE ELECTRODE ASSEMBLIES

CROSS-REFERENCE TO RELATED APPLICATIONS

This application claims priority to U.S. Application No. 61/897,307, filed Oct. 30, 2013 which is incorporated by reference.

The present invention relates to improved membrane electrode assemblies, having two electrochemically active electrodes separated by a polymer electrolyte membrane.

In polymer electrolyte membrane (PEM) fuel cells, the proton-conducting membranes used nowadays are almost exclusively sulfonic acid-modified polymers. Predominantly perfluorinated polymers are employed. A prominent example thereof is Nafion® from DuPont de Nemours, Wilmington, USA. For proton conduction, a relatively high water content in the membrane is required, which is typically 4-20 molecules of water per sulfonic acid group. The water content needed, but also the stability of the polymer in conjunction with acidic water and the hydrogen and oxygen reaction gases, limits the operating temperature of the PEM fuel cell stacks to 80-100° C. Higher operating temperatures cannot be achieved without loss of performance of the fuel cell. At temperatures above the dew point of water for a given pressure level, the membrane dries out completely, and the fuel cell no longer supplies any electrical energy since the resistance of the membrane rises to such high values that there is no longer any significant current flow.

For system-related reasons, however, higher operating temperatures than 100° C. in the fuel cell are desirable. The activity of the noble-metal-based catalysts present in the membrane electrode assembly (MEA) is much better at high operating temperatures.

More particularly, in the case of use of what are called reformates from hydrocarbons, distinct amounts of carbon monoxide are present in the reformer gas and typically have to be removed by a costly and inconvenient gas processing or gas cleaning operation. At high operating temperatures, the tolerance of the catalysts to the CO impurities rises.

In addition, heat arises in the operation of fuel cells. However, cooling of these systems to below 80° C. can be very costly and inconvenient. According to the power released, the cooling apparatus can be made much simpler. This means that, in fuel cell systems which are operated at temperatures above 100° C., the waste heat can be utilized much better and hence the fuel cell system efficiency can be enhanced.

In order to attain these temperatures, membranes with novel conductivity mechanisms are generally used, especially membranes based on polyazoles. Such membranes are described in detail, for example, in DE 10 2005 038195.

This publication also explains the production of membrane electrode assemblies which can be used in fuel cells. The membrane electrode assemblies should have two gas diffusion layers, each of which is in contact with a catalyst layer, and which are separated by the polymer electrolyte membrane.

The gas diffusion layers used in this context are flat, electrically conductive and acid-resistant structures, for example graphite fiber papers, carbon fiber papers, graphite fabrics and/or papers which have been rendered conductive by addition of carbon black.

The catalyst layers should comprise catalytically active substances, for example noble metals of the platinum group, i.e. Pt, Pd, Ir, Rh, Os, Ru, or else the noble metals Au and Ag. The metals can optionally be used on a support material, for example carbon, especially in the form of carbon black, graphite or graphitized carbon black. It is additionally possible that the catalytically active layers comprise further additives, for example fluoropolymers, especially polytetrafluoroethylene (PTFE), proton-conducting ionomers and surface-active substances.

Such electrodes are produced typically using a catalyst ink, which comprises a noble metal catalyst, for example platinum, on a support material, for example carbon black, a binder and hydrophobizing agent, for example PTFE, a surfactant and a thickener, for example methylcellulose. However, the electrode catalyst used is usually acidic, and so the catalyst ink with the components mentioned has an acidic pH. As a result of this, PTFE flocculates out of the composition since the PTFE particles can be stabilized only under alkaline conditions.

After the production, the surfactant is decomposed by sintering at relatively high temperatures, usually greater than 300° C., and the binder is heat treated. However, these high temperatures are proven to detract from the catalyst activity. Moreover, the thermal treatment can lead to oxidation of the support material, which can in turn significantly impair the performance and lifetime of the electrode.

The publication X. L. Wang et al. *Micro-porous layer with composite carbon black for PEM fuel cells* Electrochimica Acta 51 (2006) 4909-4915 discloses gas diffusion layers for fuel cells which comprise a macroporous gas diffusion layer composed of carbon fiber paper or graphite fabric and a microporous layer.

The microporous layer is obtained by applying carbon black and a hydrophobizing agent to the upper and lower side of the macroporous gas diffusion layer. The task of the microporous layer is supposed to be to provide the correct pore structure and hydrophobicity in order to bring a catalyst layer to the membrane-facing side and to enable better gas transport and better removal of water from the catalyst layer, and to reduce the electrical contact resistance to the catalyst layer.

The gas diffusion layers are tested using a Nafion® membrane at 80° C., which has been coated on the upper and lower sides with a homogeneous perfluoropolymer (PF)/C mixture. However, due to the small pores on the reverse side of the gas diffusion layer, such systems at operating temperatures above 100° C. lead to problems and to a decrease in performance. For instance, more particularly, the permeability to air at 200 Pa according to test standard EN ISO9237 is less than 5 l/m²s.

In summary, in its simplest configuration a gas diffusion electrode (GDE) therefore typically contains three elements: a conductive web such as carbon cloth or paper; a micro porous layer (MPL) that can be either the web, the web impregnated with a hydrophobic binder, or a coating of conductive carbon black mixed with a hydrophobic binder, and a layer of fine catalyst particles. These catalyst particles can be either metals or alloys as described above. A typical hydrophobic binder is polytetrafluoroethylene (PTFE). The gas diffusion electrode serves the function of being a matrix to contain catalyst, provide an electrical current collector between the catalyst sites, uniformly distribute gasses to the catalyst sites, and in the case of water generation at the cathode, aid in the removal of water. Karl V. Kordesch is generally credited with inventing the modern gas diffusion electrode, as disclosed in U.S. Pat. No. 3,477,877 and citations therein, whereby his key discovery was creating a structure compatible with highly alkaline solutions for the generation of power through reduction of oxygen and oxidation of hydrogen. His insight was to create a closed structure sufficient to prevent alkaline solution from wicking through the gas diffusion electrode but balanced with an open porosity to promote a three phase region of catalyst, alkaline electrolyte, and gas. This three phase region is critical to generating relatively high power density. At this region gas and electrolyte contact an electronically conductive catalyst that can either source or carry electrons in the electronic circuit while at the same time promoting ionic conductivity through the structure for ionic balance. The above so-called "Kordesch" electrode is notable in that it is designed for the specific function of operation in KOH electrolyte at high concentrations.

As stated before, more recently, gas diffusion electrodes have been employed as part of membrane electrode assemblies (MEAs) for use in proton exchange membrane fuel cells (PEMFCs). For these materials, a vastly different interface exists between the electrolyte and the electrode. Instead of liquid electrolyte, an ion conducting membrane such as the class of perfluorinated sulfonic acid (PFSA) membranes is employed. These are commercially available from companies such as DuPont under their trademark Nafion®. A perfluorinated sulfonic acid membrane allows the facile transport of protons from the anode to the cathode. However, the membrane alone does not provide a suitable three phase region as reported by Kordesch. Instead, one needs to "bridge" the catalyst sites and the membrane in order to provide an ionic path for the protons. This bridging is frequently done with a separate application of a soluble ionomer derivative of perfluorinated sulfonic acid. For MEAs using perfluorinated sulfonic acid, the challenge is not only activating catalyst sites, but just as importantly, managing liquid build up on the cathode side as free protons combine with oxygen to form water. As an alternative to a gas diffusion electrode, most MEAs are made through catalyst coating directly on the membrane. For example U.S. Pat. No. 5,211,984 discloses a process whereby a catalyst-ionomer ink is coated on an inert carrier to form a decal, and then pressed against a perfluorinated sulfonic acid membrane. This is called a CCM and stands for catalyst coated membrane. In order to complete functionality of the MEA, a separate micro porous layer consisting of carbon cloth or carbon paper coated with only carbon black and hydrophobic binder is pressed against the CCM. For this type of three phase interface, the native porosity of the catalyst coated with ionomer is used to control the porosity and distribution of ionomer electrolyte. Most MEAs operating at temperatures <100° C. today use the CCM approach and develop micro porous layers solely for control of water in the structure.

However, facile manufacture of gas diffusion electrodes designed to overcome some of the limitations of operation within a MEA environment is disclosed is U.S. Pat. No. 6,103,077. In principle, fabricating discrete gas diffusion electrodes in a roll-to-roll process and cutting the roll or sheets into smaller pieces to laminate directly to a ion exchange membrane is a more cost-effective method of manufacturing compared to the CCM approach that typically involves multiple steps (such as the decal method) or slow deposition due to the particular mechanical properties of the membrane once in contact with catalyst ink solvents. In U.S. Pat. No. 6,103,077 a structure consisting of a web (carbon cloth or paper) with at least one micro porous layer and at least one catalyst layer is claimed. However, while this patent claims general structures (layers of MPL, catalyst, etc.), teaches how to make inks (e.g. by high energy dispersion), and apply to a web (e.g. by gravure or slot die), one assumes that the hydrophobicity range as dictated by carbon choice and hydrophobic additive level is not relevant to performance.

An innovative method to create a gas diffusion electrode is disclosed in U.S. Pat. No. 7,419,546 whereby by an ion beam assisted physical vapor deposition is used to create a porous layer of platinum or platinum base metal mixtures directly onto the micro porous layer. The novelty of this patent intended for MEAs operating <100° C. is that no ionomer electrolyte is needed in the bridge between the electrode and the membrane, in addition to direct coating of very low levels of catalyst without the traditional carbon black support. The inventors claim one main structural feature other than the thickness of metal catalyst layer—the smoothness of the micro porous layer.

A majority of innovations developed for MEAs are for operating conditions below the boiling point of water. However, there are several approaches to making membranes that no longer derive their conductivity from water-electrolyte mixtures but instead rely on direct proton conductivity through a matrix. One such approach is disclosed in U.S. Pat. No. 7,540,984 and references therein whereby p-polybenzimadazole (PBI) is formed in the presence of polyphosphoric acid, cast as a film, and hydrolyzed to form a membrane >90% by weight phosphoric acid held in place by a PBI matrix. Since phosphoric acid has suitable conductivity above 100° C. and more preferably above 120° C., and conducts protons in the absence of water (i.e., Grothus Mechanism). These membranes are reportedly dry to the touch and can operate up to approximately 180° C. The acid is contained within the membrane and does not flow except when compression is applied to the membrane. Due to the high acid loading, a gas diffusion electrode approach to MEA making is preferred over CCM methods. MEAs using PBI or analogs are commercially available under the trademark Celtec® from BASF, Advent Technologies, Inc., or Danish Power Systems.

Electrodes for traditional phosphoric acid fuel cells have been commercially produced for over thirty years. Major corporations for this technology are ClearEdge Power (formerly UTC Fuel Cells), Fuji Electric Corporation, Toshiba Corporation, and Mitsubishi Electric Corporation. The electrode design is relatively simple as a main design goal is to contain liquid phosphoric acid and operate around 200° C. From the National Fuel Cell Research Center at University of Irvine, Calif., the gas diffusion electrode is comprised of porous carbon paper coated with a layer of supported catalyst and binder. Often the carbon paper is further made more hydrophobic by saturating with a hydrophobic binder prior to adding the catalyst layer. Although the phosphoric acid is interspersed within an inert silicon-carbide matrix that prevents the anode from shorting against the cathode, the electrode experiences the hydraulic forces of the freely mobile acid, so is designed to be of high density.

It was therefore an object of the present invention to provide an improved MEA and fuel cells operated therewith, which should preferably have the following properties:
  The cells in the case of operation at temperatures above 120° C. should exhibit a long lifetime.
  The individual cells should exhibit constant or improved performance at temperatures above 120° C. over a long period.
  The gas diffusion cathode that has a catalyst pore structure is specifically designed for optimum performance with ion conducting membranes that operate from 120° C. to 250° C.

The gas diffusion anode that has an anode pore structure is specifically designed for optimum performance with ion conducting membranes that operate from 120° C. to 250° C.

The micro porous layer that has a pore structure is specifically designed for optimum performance with ion conducting membranes that operate from 120° C. to 250° C., where the feed gas is hydrogen or hydrogen containing CO, CO2, reformate contaminants such as sulfides, and trace water vapor.

The micro porous layer that has a pore structure is specifically designed for optimum performance with ion conducting membranes that operate from 120° C. to 250° C., where exhaust gas is water vapor.

At the same time, the fuel cells should have, after long operating time, a high zero-load voltage and low gas crossover.

The fuel cells should be usable especially at operating temperatures above 120° C. and not need any additional fuel gas moistening. More particularly, the membrane electrode assemblies should be able to withstand permanent or changing pressure differences between anode and cathode.

In addition, it was therefore an object of the present invention to provide a membrane electrode assembly which can be produced in a simple and inexpensive manner. At the same time, more particularly, a minimum amount of expensive materials was to be used.

More particularly, the fuel cell even after a long time should have a high voltage and be operable at low stoichiometry.

More particularly, the MEA should be robust to different operating conditions (T, p, geometry, etc.) in order to increase general reliability.

Furthermore, expensive noble metal, especially platinum metals, should be exploited very effectively.

These objects are achieved by membrane electrode assemblies having all the features of claim 1. In addition, a particularly advantageous process for production of such membrane electrode assemblies and particularly appropriate applications are protected.

The present invention accordingly provides a membrane electrode assembly, comprising
(i) at least one phosphoric acid-containing polymer electrolyte membrane and
(ii) two gas diffusion electrodes one of each located at both sides of said membrane,
(iii) each of the gas diffusion electrodes having at least one catalyst layer facing towards the membrane
(iv) at least one of said gas diffusion electrodes having said at least one catalyst layer facing towards the membrane consists of:
  (a) at least one gas diffusion medium comprising an electrically conductive macroporous layer in which the pores have a mean pore diameter in the range from 10 μm to 30 μm,
  (b) at least one micro porous layer arranged between said gas diffusion medium and said catalyst layer facing towards the membrane,
(v) said microporous layer (MPL) and said gas diffusion medium suitable as a base for either anode or cathode catalyst layers, having:
  (a) a pore void volume range of between 0.8 mL/g and 1.6 mL/g and
  (b) a pore hydrophobicity measured by the Cobb Titration test between 60% Ethanol:Water and 80% Ethanol:Water,
(vi) said entire cathode gas diffusion electrode as defined in (iv) consisting of gas diffusion medium, microporous layer and catalyst layer having:
  (a) a pore void volume of X, whereby 0.8 mL/g<X<1.0 mL/g/total pore volume
  (b) a pore hydrophobicity measured by the Cobb Titration test between 60% Ethanol:Water and 80% Ethanol:Water
(vii) said cathode catalyst layer of (vi) as defined in (iv) having:
  (a) a pore void volume of X, whereby 0.05 mL/g<X<0.10 mL/g/total pore volume and
  (b) a pore hydrophobicity measured by the Cobb Titration test between 50% Ethanol:Water and 70% Ethanol:Water and:
(viii) said entire anode gas diffusion electrode as defined in (iv) consisting of gas diffusion medium, microporous layer and catalyst layer having:
  (a) a pore void volume of X, whereby 0.85 mL/g<X<1.0 mL/g/total pore volume and
  (b) a pore hydrophobicity measured by the Cobb Titration test between 50% Ethanol:Water and 70% Ethanol:Water and:
(ix) said anode catalyst layer of (viii) as defined in (iv) having:
  (a) a pore void volume of X, whereby 0.05 mL/g<X<0.10 mL/g/total pore volume and
  (b) a pore hydrophobicity measured by the Cobb Titration test between 50% Ethanol:Water and 70% Ethanol:Water.

DESCRIPTION OF THE DRAWINGS

FIG. 9: Cobb Titration of Anode formed on carbon cloth substrate with PTFE to catalyst loadings from 15% to 50% by weight.

FIG. 10: Summary of Anode fuel cell test results whereby catalyst layer PTFE is varied from 15% to 50% by weight, operation under reformate/air at 180° C., voltage when operating at 0.2 A/cm². Reformate is reformate=70% $H_2$, 28% $CO_2$, 2% CO. Anode is run at 1.2× stoichiometry.

Polymer Electrolyte Membranes

Figure 1:
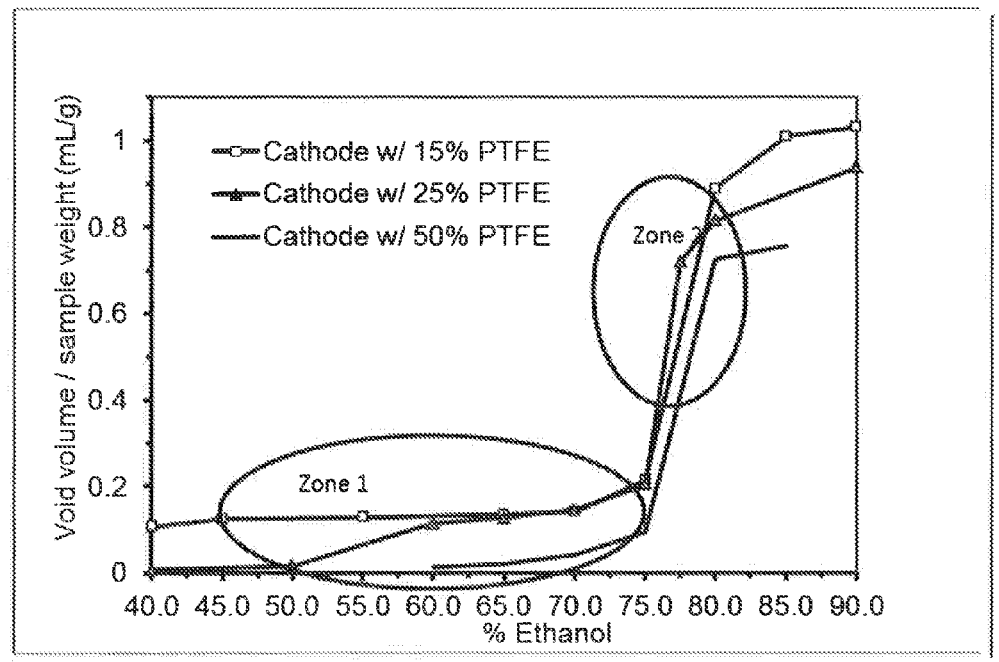
FIG. 1: Example of results from a Cobb Titration. The "Y" axis denotes pore volume via the weight (volume) of solvent mix absorbed, and is replotted here as a function of total porosity where 1.0=all pores flooded with solvent. The "X" axis denotes degree of hydrophobicity. Greater amounts of alcohol are needed to wet out the progressively more hydrophobic pores. Area labeled "Zone 1" designates the catalyst layer (more hydrophilic), and when testing whole gas diffusion electrodes, is more easily wetted (lower % EtOH) than the microporous layer. "Zone 2" denotes the MPL (more hydrophobic). Shown for three different Weight % PTFE compositions in the catalyst layer. In all cases reformate is 70% $H_2$, 28% $CO_2$, 2% CO.

Polymer electrolyte membranes suitable for the purposes of the present invention are known per se and are described especially in U.S. Pat. No. 5,525,436, DE-A-101 17 687, DE-A-101 10 752, DE-A-103 31 365, DE-A-100 52 242, US 2008160378, US 2008233435, DE-U-20217178 and Handbook of Fuel Cells—Fundamentals and Technology and Applications, Vol. 3, Chapter 3, High temperature membranes, J. S. Wainright, M. H. Litt and R. F. Savinell.

According to the invention, polymer electrolyte membranes comprising phosphoric acid are used, preferably such phosphoric acid is not covalently bonded to the polymer of the polymer electrolyte membrane.

According to the invention, polymer electrolyte membranes provide a proton conductivity of the membrane without humidification of at least 100 mS/cm, preferably at least 110 mS/cm, at 160° C., preferably at 180° C.

The membranes can be produced by methods including swelling of flat materials, for example of a polymer film, with a liquid comprising phosphoric acid or phosphoric acid-releasing compounds, or by production of a mixture of polymers and phosphoric acid-containing or phosphoric acid-releasing compounds and subsequent formation of a membrane by forming a flat article and then solidifying, in order to form a membrane.

Polymers suitable for this purpose include polyolefins such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitrosomethane, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, especially those of norbornene;

polymers having C—O bonds in the backbone, for example polyacetal, polyoxymethylene, polyethers, polypropylene oxide, polyepichlorohydrin, polytetrahydrofuran, polyphenylene oxide, polyether ketone, polyesters, especially polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the backbone, for example polysulfide ethers, polyphenylene sulfide, polysulfones, polyether sulfone;

polymers having C≡N bonds in the backbone, for example polyimines, polyisocyanides, polyetherimine, polyetherimides, polyaniline, polyaramids, polyamides, polyhydrazides, polyurethanes, polyimides, polyazoles, polyazole ether ketone, polyazines;

liquid-crystalline polymers, especially Vectra, and inorganic polymers, for example polysilanes, polycarbosilanes, polysiloxanes, polysilicic acid, polysilicates, silicones, polyphosphazenes and polythiazyl.

Preference is given to basic polymers. More particularly, virtually all known polymer membranes in which the protons can be transported are useful. Preference is given here to acids which can convey protons without additional water, for example by means of what is called the Grotthus mechanism.

The basic polymer used in the context of the present invention is preferably a basic polymer having at least a nitrogen atom in a repeat unit.

The repeat unit in the basic polymer comprises, in a preferred embodiment, an aromatic ring having at least one nitrogen atom. The aromatic ring is preferably a five- or six-membered ring having one to three nitrogen atoms, which may be fused to another ring, especially another aromatic ring.

In a particular aspect of the present invention, polymers of high thermal stability which comprise at least one nitrogen, oxygen and/or sulfur atom in one repeat unit or in different repeat units are used.

A polymer having "high thermal stability" in the context of the present invention is one which can be operated for a prolonged period as a polymeric electrolyte in a fuel cell at temperatures above 120° C. "For a prolonged period" means that an inventive membrane can be operated for at least 100 hours, preferably at least 500 hours, at at least 110° C., preferably at least 120° C., more preferably at least 160° C., without any decrease in the performance, which can be measured by the method described in WO 01/18894 A2, by more than 50%, based on the starting performance.

The aforementioned polymers can be used individually or as a mixture (blend). Preference is given here especially to blends which comprise polyazoles and/or polysulfones. The preferred blend components are polyether sulfone, polyether ketone and polymers modified with sulfonic acid groups as described in German patent applications DE-A-100 52 242 and DE-A-102 45 451. The use of blends can improve the mechanical properties and reduce the material costs.

A particularly preferred group of basic polymers is that of polyazoles. A basic polymer based on polyazole comprises repeat azole units of the general formula (I) and/or (II) and/or (III) and/or (IV)

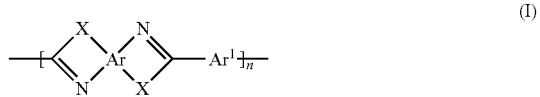

(I)

-continued

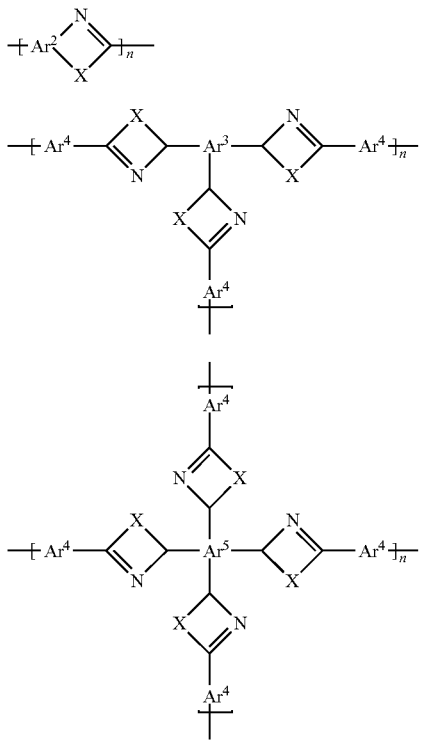

in which
Ar is the same or different and is a tetravalent aromatic or heteroaromatic group, which may be mono- or polycyclic,
$Ar^1$ is the same or different and is a divalent aromatic or heteroaromatic group, which may be mono- or polycyclic,
$Ar^2$ is the same or different and is a di- or trivalent aromatic or heteroaromatic group, which may be mono- or polycyclic,
$Ar^3$ is the same or different and is a trivalent aromatic or heteroaromatic group, which may be mono- or polycyclic,
$Ar^4$ is the same or different and is a trivalent aromatic or heteroaromatic group, which may be mono- or polycyclic,
$Ar^5$ is the same or different and is a tetravalent aromatic or heteroaromatic group, which may be mono- or polycyclic,
X is the same or different and is oxygen, sulfur or an amino group, which bears a hydrogen atom, a group having 1 to 20 carbon atoms, preferably a branched or unbranched alkyl or alkoxy group, or an aryl group as a further radical
n is an integer greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

Preference is given to polyazoles with repeat units of the formula (I), in which the X radicals are the same within one repeat unit.

The polyazoles may in principle also have different repeat units which differ, for example, in the X radical thereof. Preferably, however, it only has identical X radicals in one repeat unit.

Further preferred polyazole polymers are polyimidazoles, polybenzthiazoles, polybenzoxazoles, polyoxadiazoles, polyquinoxalines, polythiadiazoles poly(pyridines), poly(pyrimidines), and poly(tetrazapyrenes).

In a particularly preferred embodiment of the present invention, the polymer comprising repeat azole units is a polyazole, which comprises only units of the formula (I) and/or (II).

The number of repeat azole units in the polymer is preferably an integer greater than or equal to 10. Particularly preferred polymers comprise at least 100 repeat azole units.

The polyazoles used, but especially the polybenzimidazoles, are notable for a high molecular weight. Measured as the intrinsic viscosity, it is at least 0.2 dl/g, preferably 0.8 to 10 dl/g, especially 1 to 10 dl/g.

The preparation of such polyazoles is known and described in DE-A-101 17 687, one or more aromatic tetraamino compounds being reacted with one or more aromatic carboxylic acids or esters thereof which comprise at least two acid groups per carboxylic acid monomer in the melt to give a prepolymer. The resulting prepolymer solidifies in the reactor and is then mechanically comminuted. The pulverulent prepolymer is typically finally polymerized in a solid phase polymerization at temperatures of up to 400° C.

For production of polymer films, a polymer, preferably a polyazole, can be dissolved in a further step in polar aprotic solvents, for example dimethylacetamide (DMAc), and a film can be produced by means of conventional processes.

To remove solvent residues, the film thus obtained can be treated with a wash liquid, as described in German patent application DE-A-101 09 829. The cleaning of the polyazole film to remove solvent residues, described in German patent application, surprisingly improves the mechanical properties of the film. These properties include especially the modulus of elasticity, the breaking strength and the fracture toughness of the film.

In addition, the polymer film may have further modifications, for example, by crosslinking, as described in German patent application DE-A-101 10 752 or in WO 00/44816. In a preferred embodiment, the polymer film used, composed of a basic polymer and at least one blend component, additionally comprises a crosslinker, as described in German patent application DE-A-101 40 147.

The thickness of the polyazole films may be within wide ranges. The thickness of the polyazole film before doping with acid is preferably in the range from 5 μm to 2000 μm, more preferably in the range from 10 μm to 1000 μm, without any intention that this should impose a restriction.

In order to achieve proton conductivity, these films are doped with a phosphoric acid. In addition, it is also possible to use polyphosphoric acids, which are then at least partly hydrolyzed.

The degree of doping can be used to influence the conductivity of the polyazole membrane. The conductivity increases with rising concentration of dopant until a maximum value is attained. According to the invention, the degree of doping is reported as moles of acid per mole of repeat unit of the polymer. In the context of the present invention, preference is given to a degree of doping between 3 and 50, especially between 5 and 40.

In general, highly concentrated acids are used. In a particular aspect of the present invention, the concentration of the phosphoric acid is at least 50% by weight, especially at least 80% by weight, based on the weight of the dopant.

In addition, it is also possible to obtain proton-conductive membranes by a process comprising the steps of
I) dissolving polymers, especially polyazoles in polyphosphoric acid,
II) heating the solution obtainable in step A) under inert gas to temperatures of up to 400° C.,
III) forming a membrane using the solution of the polymer according to step II) on a support and
IV) treating the membrane formed in step III) until it is self-supporting.

In addition, doped polyazole films can be obtained by a process comprising the steps of
A) mixing one or more aromatic tetraamino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion
B) applying a layer using the mixture according to step A) on a support or on an electrode,
C) heating the flat structure/layer obtainable according to step B) under inert gas to temperatures of up to 350° C., preferably up to 280° C., to form the polyazole polymer,
D) treating the membrane formed in step C) (until it is self-supporting).

The aromatic or heteroaromatic carboxylic acid and tetraamino compounds to be used in step A) have been described above.

The polyphosphoric acid used in step A) comprises commercial polyphosphoric acids, as obtainable, for example, from Riedel-de Haen. The polyphosphoric acids $H_{n+2}P_nO_{3n+1}$ (n>1) typically have a content, calculated as $P_2O_5$ (by acidimetric means), of at least 83%. Instead of a solution of the monomers, it is also possible to produce a dispersion/suspension.

The mixture obtained in step A) has a weight ratio of polyphosphoric acid to sum of all monomers of 1:10 000 to 10 000:1, preferably 1:1000 to 1000:1, especially 1:100 to 100:1.

The layer formation in step B) is effected by means of measures known per se (casting, spraying, knife-coating) which are known from the prior art for polymer film production. Suitable supports are all supports which can be described as inert under the conditions. To adjust the viscosity, the solution can optionally be admixed with phosphoric acid (conc. phosphoric acid, 85%). This can adjust the viscosity to the desired value and facilitate the formation of the membrane.

The layer produced in step B) has a thickness between 20 and 4000 μm, preferably between 30 and 3500 μm, especially between 50 and 3000 μm.

If the mixture according to step A) also comprises tricarboxylic acids or tetracarboxylic acids, this achieves branching/crosslinking of the polymer formed. This contributes to an improvement in the mechanical properties.

The polymer layer produced in step C) is treated in the presence of moisture at temperatures and for durations sufficient for the layer to have sufficient strength for use in fuel cells. The treatment can be effected to such an extent that the membrane is self-supporting, such that it can be detached from the support without damage.

In step C), the flat structure obtained in step B) is heated to a temperature of up to 350° C., preferably up to 280° C. and more preferably in the range from 200° C. to 250° C.

The inert gases for use in step C) are known in the technical field. These include especially nitrogen and noble gases, such as neon, argon, helium.

In one variant of the process, heating the mixture from step A) to temperatures of up to 350° C., preferably up to 280° C., can already bring about the formation of oligomers and/or polymers. Depending on the temperature and duration selected, it is subsequently possible to partly or entirely dispense with the heating in step C). This variant too forms part of the subject matter of the present invention.

The membrane is treated in step D) at temperatures above 0° C. and less than 150° C., preferably at temperatures between 10° C. and 120° C., especially between room temperature (20° C.) and 90° C., in the presence of moisture or water and/or water vapor and/or water-containing phosphoric acid of up to 85%. The treatment is preferably effected under standard pressure, but can also be effected under pressure. What is essential is that the treatment takes place in the presence of sufficient moisture, as a result of which the polyphosphoric acid present contributes to the consolidation of the membrane by partial hydrolysis to form low molecular weight polyphosphoric acid and/or phosphoric acid.

The hydrolysis liquid may be a solution, in which case the liquid may also comprise suspended and/or dispersed constituents. The viscosity of the hydrolysis liquid may be within wide ranges, and the viscosity can be adjusted by adding solvents or increasing the temperature. The dynamic viscosity is preferably in the range from 0.1 to 10 000 mPa*s, especially 0.2 to 2000 mPa*s, and these values can be measured, for example, to DIN 53015.

The treatment in step D) can be effected by any known method. For example, the membrane obtained in step C) can be immersed into a liquid bath. In addition, the hydrolysis liquid can be sprayed onto the membrane. Moreover, the hydrolysis liquid can be poured over the membrane. The latter methods have the advantage that the concentration of acid in the hydrolysis liquid remains constant during the hydrolysis. However, the first process is frequently less expensive to execute.

Gas Diffusion Electrodes

In addition to the polymer electrolyte membrane, the inventive membrane electrode assembly further comprises at least one gas diffusion electrode as defined above. Typically two electrochemically active electrodes are used (anode and cathode), which are separated by the polymer electrolyte membrane. The term "electrochemically active" indicates that the electrodes are capable of catalyzing the oxidation of hydrogen and/or at least one reformate and the reduction of oxygen. This property can be obtained by coating the electrodes with catalytically active substances such as platinum and/or ruthenium. The term "electrode" means that the material is electrically conductive. The electrode may optionally have a noble metal layer. Such electrodes are known and are described, for example in U.S. Pat. No. 4,191,618, U.S. Pat. No. 4,212,714 and U.S. Pat. No. 4,333,805.

Suitable catalytically active materials are preferably catalytically active metals. These are known to those skilled in the art. Suitable catalytically active metals are generally selected from the group consisting of platinum, palladium, iridium, rhodium, ruthenium and mixtures thereof, more preferably platinum and/or ruthenium. In a very particularly preferred embodiment platinum alone or a mixture of platinum and ruthenium is used. It is also possible to use the polyoxymetallates known to those skilled in the art.

The catalytically active metals or mixtures of different metals used with preference may optionally comprise further alloy additives selected from the group consisting of cobalt, chromium, tungsten, molybdenum, vanadium, iron, copper, nickel, silver, gold, iridium, tin, etc. and mixtures thereof.

In a further preferred embodiment, the at least one catalytically active material has been applied to a suitable support material. Suitable support materials are known to those skilled in the art, for example electron conductors selected from the group consisting of carbon black, graphite, carbon fibers, carbon nanoparticles, carbon foams, carbon nanotubes and mixtures thereof.

In the case of a fuel cell, which is to be operated with a carbon monoxide-comprising reformate gas as fuel, it is advantageous when the anode catalyst has a maximum resistance to poisoning by carbon monoxide. In such a case, preference is given to using electrocatalysts based on platinum/ruthenium.

The gas diffusion electrode for use in accordance with the invention comprises at least one gas diffusion medium, at least one catalyst layer and at least one micro porous layer between the gas diffusion medium and the catalyst layer as defined above and below. In the context of a first preferred embodiment of the present invention, these are joined directly to one another. In the context of an alternative preferred embodiment of the present invention, catalyst-coated polymer electrolyte membranes are used, which form the gas diffusion electrode on combination with the gas diffusion medium.

Gas diffusion media are known per se and are described, for example, in U.S. Pat. No. 6,017,650, U.S. Pat. No. 6,379,834 and U.S. Pat. No. 6,165,636. They serve especially for gas distribution, for water management, for current output, for mechanical integrity and for heat conduction.

The gas diffusion media used are typically flat, electrically conductive and acid-resistant structures. These include, for example, graphite fiber papers, carbon fiber papers, graphite fabric and/or papers which have been rendered conductive by addition of carbon black. These layers achieve a fine distribution of the gas and/or liquid streams.

In addition, it is also possible to use gas diffusion media which comprise a mechanically stable support material which has been impregnated with at least one electrically conductive material, e.g. carbon (for example, carbon black), and optionally a binder. It is of course also possible to use other types of electrically conductive particles, for example metal particles, in place of the carbon or in addition thereto.

Support materials particularly suitable for these purposes comprise fibers, for example in the form of nonwovens, papers or fabrics, especially carbon fibers, glass fibers or fibers comprising organic polymers, for example polypropylene, polyester (polyethylene terephthalate), polyphenylene sulfide or polyether ketones. Further details regarding such gas diffusion media can be found, for example, in WO 9720358.

The gas diffusion media may comprise customary additives. These include surface-active substances.

In a particular embodiment, at least one layer of the gas diffusion media may consist of a compressible material. In the context of the present invention, a compressible material is characterized by the property that the material, without losing its integrity, can be compressed by pressure to half, especially to one third, of its original thicknesses.

This property is generally possessed by gas diffusion layers composed of graphite fabric and/or paper which has been rendered conductive by addition of carbon black.

In the context of the present invention, at least one of said gas diffusion electrodes having at least one catalyst layer facing towards the membrane consists of:
(a) at least one gas diffusion medium comprising an electrically conductive macroporous layer in which the pores have a mean pore diameter in the range from 10 µm to 30 µm,
(b) at least one micro porous layer arranged between said gas diffusion medium and said catalyst layer facing towards the membrane, and the following attributes:
(i) said microporous layer (MPL) and gas diffusion medium suitable as a base for either anode or cathode catalyst layers, having:
 (a) a pore void volume range of between 0.8 mL/g and 1.6 mL/g and
 (b) a pore hydrophobicity measured by the Cobb Titration test between 60% Ethanol:Water and 80% Ethanol:Water,
(ii) said entire cathode gas diffusion electrode as defined above consisting of gas diffusion medium, microporous layer and catalyst layer having:
 (a) a pore void volume of X, whereby 0.8 mL/g<X<1.0 mL/g/total pore volume
 (b) a pore hydrophobicity measured by the Cobb Titration test between 60% Ethanol:Water and 80% Ethanol:Water
(iii) said cathode catalyst layer of (ii) having:
 (a) a pore void volume of X, whereby 0.05 mL/g<X<0.10 mL/g/total pore volume and
 (b) a pore hydrophobicity measured by the Cobb Titration test between 50% Ethanol:Water and 70% Ethanol:Water,
(iii) said entire anode gas diffusion electrode as defined above consisting of gas diffusion medium, microporous layer and catalyst layer having:
 (a) a pore void volume of X, whereby 0.85 mL/g<X<1.0 mL/g/total pore volume and
 (b) a pore hydrophobicity measured by the Cobb Titration test between 50% Ethanol:Water and 70% Ethanol:Water,
(iv) said anode catalyst layer of (iii) as defined above having:
 (a) a pore void volume of X, whereby 0.05 mL/g<X<0.10 mL/g/total pore volume and
 (b) a pore hydrophobicity measured by the Cobb Titration test between 50% Ethanol:Water and 70% Ethanol:Water.

In a particularly preferred embodiment of the present invention the micro porous layer can be a part of the gas diffusion medium facing towards the catalyst layer.

The gas diffusion medium comprising an electrically conductive macroporous layer in which the pores have a mean pore diameter in the range from 10 µm to 30 µm is typically a flat, electrically conductive and acid-resistant structure. These include, for example, graphite fiber papers, carbon fiber papers, graphite fabric and/or papers which have been rendered conductive by addition of carbon black. These layers achieve a fine distribution of the gas and/or liquid streams.

The mean pore diameter ranges from 10 µm to 30 µm, preferably from 15 µm to 25 µm. In this connection, the pore size can be determined by processes known per se. The process of mercury porosimetry has been found to be particularly useful, especially according to the standard DIN 66 133, June 1993.

The gas diffusion medium preferably has a thickness in the range from 80 μm to 2000 μm, especially in the range from 100 μm to 1000 μm and more preferably in the range from 150 μm to 500 μm.

The gas diffusion medium used as substrates, such as carbon cloth or carbon paper, should have a conductivity (through-plane resistivity) of <10 mOhmcm$^2$, and <15 mOhmcm$^2$ when coated with a micro porous layer as measured per ASTM C-611. Basis weight of such cloth substrates can range from 90-120 g/m$^2$ and more preferably 95-110 g/m$^2$, and for paper 30-100 g/m$^2$ and more preferably 35-60 g/m$^2$.

The micro porous layer can be a coating on top of the aforementioned gas diffusion medium or the coating can penetrate the gas diffusion medium and become a part of the gas diffusion medium facing towards the catalyst layer. In the latter case, the total thickness remains in the aforementioned ranges.

The micro porous layer preferably has a thickness in the range from 25 μm to 100 μm, especially in the range from 40 μm to 80 μm and more preferably in the range from 50 μm to 70 μm.

The mean pore diameter in the micro porous layer preferably ranges from 10 μm to 30 μm, preferably from 15 μm to 25 μm. In this connection, the pore size can be determined by processes known per se. The process of mercury porosimetry has been found to be particularly useful, especially according to the standard DIN 66 133, June 1993.

In addition, a method called a "Cobb Titration" was developed and published by the inventors and provides pore volume and pore hydrophobicity at the same time (De Castro et. Al., US Department of Energy, Hydrogen and Fuel Cell Annual Merit Review, 2005, Presentation FC2, page 7) and is described in more detail herein as example (0) and summarized below.

The pore structure of a gas diffusion electrode is a complex mixture of porosity and hydrophobicity. Each pore void unto itself is created from the arrangement of carbon fibers from the substrate (carbon cloth or carbon paper), carbon black or catalyzed carbon black, and hydrophobic binder. The pore void volume, pore surface area, and thus hydrophobicity of the surface presented is dictated by selection of the materials such as carbon fiber and carbon black, and their processing conditions; how the material is assembled such as application onto the web via a paste or ink; and level of hydrophobic additives intermixed. For the high temperature MEA that depends on electrolytes such as phosphoric acid, the combination of capillary forces and hydrophobicity determines how the three phase interface is formed and the balance, as Kordesh points out, between gas permeability and electrolyte repulsion or wetting out of the catalyst.

Traditional methods of measuring pore hydrophobicity typically fail to capture the properties of the whole ensemble of porosity-hydrophobicity presented to the membrane. For example contact angle measurements only measure the surface hydrophobicity on a very small (~6 mm$^2$) area of the electrode. One then extrapolates to the entire electrode, that can be >600 cm$^2$, and also misses the interaction of porosity and capillary forces. Others have adapted a Krauss Processor Tensiometer using the Washburn method to obtain interior pore contact angles and surface energies (J. Colloid Interface Sci. 2010 Oct. 15; 350(2):577-80, "Technique for characterization of the wettability properties of gas diffusion media for proton exchange membrane fuel cells," Gurau, V. and Mann, J. A. Jr.). However, this method is restricted to only the gas diffusion layer or MPL and is unable to sort out a catalyst layer's porosity and hydrophobicity while part of a microporous layer-substrate construction.

In order to guide our invention for optimum porosity/hydrophobicity constructions for use with high temperature membranes, we first developed an analytical test that provides measurement over a large area (~100 cm$^2$) resulting in a curve that defines porosity and hydrophobicity at the same time. We are able to then link the physical characteristics of this curve (pore volume, hydrophobicity) with performance and define a range of conditions that uniquely work best with high temperature membranes.

The test is derived from a standard procedure for determining liquid carrying capacity in absorptive media such as filters, towels, diapers, etc. and the test kit is from the Gurley Company (Troy, N.Y.) and is called a Model 4180-C Cobb sizing Tester. However, instead of subjecting the samples to a completely wetting solvent as is done in the Cobb sizing tester, we start with a mixture of water-alcohol that has low wetting properties. We weigh the amount of solvent that is absorbed into the gas diffusion electrode, dry the electrode, and test again with a slightly higher alcohol concentration. The procedure is repeated until the catalyst layer, micro porous layer, and gas diffusion medium (substrate) are flooded with solvent. This is called a Cobb Titration within the spirit of this invention. Typical profiles are shown in FIG. 1.

The total amount of hydrophobic, fluorine containing, binder in the micro porous layer ranges from 15% by weight to 50% by weight, preferably from 20% by weight to 45% by weight whereby this percentage is measured as a fraction of binder weight to total binder plus carbon black weight.

In this connection, the fluorine amount can be determined in a manner known per se. Particularly useful processes in this connection have been found to be scanning electron microscopy (SEM), electron probe microanalysis (EPMA) and energy-dispersive X-ray spectroscopy (EDXS), especially energy-dispersive X-ray spectroscopy (EDXS) processes, which are described in detail, for example in the publication Ludwig Reimer Scanning Electron Microscopy: Physics of Image Formation and Microanalysis (Springer Series in Optical Sciences), Springer, Berlin; 2nd edition; Sep. 17, 1998.

The instant inventors found that for the microporous layer and gas diffusion medium (substrate) combined, an optimum of pore void volume is between 0.8 ml/g and 1.6 ml/g, and more preferably 0.9 to 1.1 ml/g while at the same time the hydrophobicity of the pores, as measured by the Cobb Titration, should between titrant mixtures of 50% and 75% Ethanol:Water, and more preferably 55% and 70% Ethanol:Water (Zone 2 in FIG. 1)

The aforementioned values for porosity/void volume and hydrophobicity can be obtained by a variety of combinations of substrate and carbon black type, but in our examples obtained by varying hydrophobic binder from 15% wt. to carbon to 55% wt. hydrophobic binder to carbon.

The microporous layer preferably comprises a minimum level of carbon black particles, with a particle size less than 100 nm. The micro porous layer preferably comprises a combination of solids (carbon black and polytetrafluoroethylene binder), with a range of loadings on the substrate (carbon cloth, carbon paper) from 20 g/m$^2$ to 100 g/m$^2$ and more preferably 30 g/m$^2$ to 70 g/m$^2$.

In this connection, the thicknesses of the gas diffusion medium as well as the thicknesses of the micro porous layer can be obtained in a manner known per se, especially by means of scanning electron microscopy (SEM).

The catalyst layer(s) comprise(s) catalytically active substances. These include noble metals of the platinum group, i.e. Pt, Pd, Ir, Rh, Os, Ru, or else the noble metals Au and Ag. It is also possible to use alloys of all aforementioned metals. In addition, at least one catalyst layer may comprise alloys of the platinum group elements with base metals, for example Fe, Co, Ni, Cr, Mn, Zr, Ti, Ga, V, etc.

If the gas diffusion electrode according to the present invention is used as an anode in a membrane electrode assembly it is preferred that the catalysts comprise platinum and/or ruthenium.

If the gas diffusion electrode according to the present invention is used as a cathode it is preferred that the catalysts comprise platinum, platinum-cobalt or platinum-nickel alloys.

The catalytically active particles which comprise the aforementioned substances can be used in the form of metal powder, known as noble metal black, especially in the form of platinum and/or platinum alloys. Such particles generally have a size in the range from 5 nm to 200 nm, preferably in the range from 7 nm to 100 nm.

In addition, the metals can also be used on a support material. This support preferably comprises carbon, which can be used especially in the form of carbon black, graphite or graphitized carbon black. In addition, it is also possible to use electrically conductive metal oxides, for example $SnO_x$, $TiO_x$, or phosphates, for example $FePO_x$, $NbPO_x$, $Zr_y(PO_x)_z$ as the support material. In these formulae, the indices x, y and z indicate the oxygen or metal content of the individual compounds, which may be within a known range, since the transition metals can assume different oxidation states.

The content of these supported metal particles, based on the total weight of the metal-support compound, is generally in the range from 1% by weight to 80% by weight, preferably 5% by weight to 60% by weight and more preferably 10% by weight to 50% by weight, without any intention that this should impose a restriction. The particle size of the support, especially the size of the carbon particles, is preferably in the range from 20 nm to 1000 nm, especially 30 nm to 100 nm. The size of the metal particles present thereon is preferably in the range from 1 nm to 20 nm, especially 1 nm to 10 nm and more preferably 2 nm to 6 nm.

The sizes of the different particles are averages and can be determined by means of transmission electron microscopy or X-ray powder diffractometry.

The catalytically active particles detailed above can generally be obtained commercially through such companies as BASF, Johnson-Matthey, or Tanaka Kikinzoku Kogyo K.K.

As in the micro porous layer, the Cobb Titration can be used to define a heretofore unknown pore volume/pore hydrophobicity needed to optimize catalyst layer structure when gas diffusion electrodes are employed with membranes comprised of phosphoric acid as the electrolyte. FIG. 1, zone 1 demonstrates how pore volume/hydrophobicity can be affected by the structure of the catalyst layer, and evidenced by a change in the level of a binder polytetrafluoroethylene.

One can employ an array of catalyzed carbon blacks, unsupported catalysts, or non-carbon supported catalysts, and hydrophobic binder(s) to create an optimum pore volume/pore hydrophobicity for use at operation over 100° C. As found be the instant inventors, for the cathode electrode layer, a pore volume between 0.06 mL/g and 0.12 mL/g, and more preferably a pore volume between 0.05 mL/g and 0.10 mL/g when combined with a pore hydrophobicity as measured by the Cobb Titration test and demonstrates a pore hydrophobicity between 45% Ethanol:Water and 75% Ethanol:Water, and more preferably 50% Ethanol:Water and 70% Ethanol:Water.

This optimum pore structure is applicable for both cathode and anode electrode layers.

In addition, to achieve this structural feature of pore volume and pore hydrophobicity, the catalytically active layer may comprise customary additives. These include fluoropolymers, for example polytetrafluoroethylene (PTFE), proton-conducting ionomers and surface-active substances.

To achieve this advantageous pore volume/hydrophobicity structure for the cathode, by example the content of polytetrafluoroethylene in the catalyst layer is advantageously less than 50% by weight, favorably less than 40% by weight, more preferably less than 30% by weight, and in all cases greater than 15% based in each case on the total weight of polytetrafluoroethylene in the catalyst layer to the combined weight of polytetrafluoroethylene+catalyst.

Moreover, the content of surfactants in the catalyst layer is advantageously less than 30% by weight, favorably less than 10% by weight, more preferably less than 1% by weight, based in each case on the total weight of the catalyst layer.

In a particularly preferred embodiment of the present invention, the catalyst layer does not comprise any surfactants.

The catalyst layer preferably has a thickness in the range from 1 μm to 500 μm, especially in the range from 5 μm to 250 μm, preferably in the range from 10 μm to 150 μm. This value is an average, which can be determined by measuring the layer thickness in the cross section of images which can be obtained with a scanning electron microscope (SEM).

In a particularly preferred embodiment of the present invention, the noble metal content of the catalyst layer is 0.1 $mg/cm^2$ to 5.0 $mg/cm^2$, preferably 0.3 $mg/cm^2$ to 4.0 $mg/cm^2$ and more preferably 0.3 $mg/cm^2$ to 3.0 $mg/cm^2$. These values can be determined by elemental analysis of a flat sample.

For further information about membrane electrode assemblies, reference is made to the technical literature, especially to patent applications WO 01/18894 A2, DE 195 09 748, DE 195 09 749, WO 00/26982, WO 92/15121 and DE 197 57 492 and to the publications W. Vielstich, H. Gasteiger, A. Lamm (editors) *Handbook of Fuel Cells—Fundamentals, Technology and Applications*, volume 3: *Fuel Cell Technology and Applications*, chapter 43: *Principles of MEA preparation* 2003 John Wiley and Sons, Ltd. pages 538-565 and W. Vielstich, H. Gasteiger, A. Lamm (editors) *Handbook of Fuel Cells—Fundamentals, Technology and Applications*, volume 3: *Fuel Cell Technology and Applications*, chapter 42: Diffusion *media materials and characterisation* 2003 John Wiley and Sons, Ltd. pages 538-565. The disclosure in the aforementioned references with regard to the structure and production of membrane electrode assemblies, and the electrodes, gas diffusion layers and catalysts to be selected, is also part of the description.

The inventive membrane electrode assembly can be produced in a manner known per se by combining the elements. Such a membrane electrode assembly is preferably produced by hot pressing. For this purpose, a gas diffusion electrode and a proton-conducting membrane, are heated to a temperature in the range from 50° C. to 200° C. and pressed at a pressure in the range from 1 MPa to 10 MPa. A couple of minutes are generally sufficient to bond the catalyst layer to the membrane layer. This time is preferably in the range from 30 seconds to 10 minutes, especially in the range from 30 seconds to 5 minutes.

In a less-preferred variant, the membrane electrode assembly is obtained by first applying a catalyst layer to the membrane in order first to produce a catalyst-coated membrane (CCM), in order then to laminate the catalyst-coated membrane with a gas diffusion medium on a substrate. The gas diffusion medium to be used has the above-described multilayer structure.

A particularly useful procedure has also been found to be one in which i.) 20 to 50 weight % of hydrophobic, fluorine containing, binder, preferably polytetrafluoroethylene, is mixed with an acetylene black and applied to a gas diffusion medium which comprises an electrically conductive macroporous layer ranging from 30 g/m² to 110 g/m² and after applying and drying of the carbon mixture of hydrophobic, fluorine containing, binder, preferably polytetrafluoroethylene, (the micro porous layer)

ii.) applying a mixture of catalyst and hydrophobic binder rangining from 15 to 50 weight % of hydrophobic, fluorine containing, binder, preferably polytetrafluoroethylene, and catalyst to a level of metal loading from 0.1 mg/cm² to 5 mg/cm² iii.) the gas diffusion electrode from step is heat treated at temperatures greater than 100° C., and iv.) thermally activate said gas diffusion electrode at a temperature greater than the glass transition point of the binder.

For hydrophobic, fluorine containing, binder, in particular consisting of PTFE, thermal activation is favorably at a temperature greater than 320° C., preferably in the range from 330° C. to 340° C., especially in the range from 335° C. to less than 370° C. The duration of the thermal treatment is preferably selected within the range from 1 minute to 2 h.

The catalyst material is preferably applied using a catalyst ink which comprises the catalytically active material and a binder, preferably polytetrafluoroethylene. The proportion of polytetrafluoroethylene in the catalyst ink is preferably in the range from 20% by weight to 50% by weight, based on the total weight of catalytically active material in the catalyst ink. In addition, to stabilize the suspension, surfactants and stabilizers well known to those in the art can be adjusted so that the content of surfactants in the binder is advantageously less than 100% by weight, preferably less than 50% by weight, more preferably less than 10% by weight, most preferably less than 1% by weight, especially 0% by weight, based on the total weight of catalyst ink.

The inventive membrane electrode assembly (MEA) is particularly suitable for fuel cell applications, especially for power generation at a temperature greater than 120° C.

It has been found that, surprisingly, inventive single fuel cells, owing to their dimensional stability at varying ambient temperatures and air humidity, can be stored or shipped without any problem. Even after prolonged storage or after shipping to sites with very different climatic conditions, the dimensions of the single fuel cells are correct for problem-free incorporation into fuel cell stacks. The single fuel cell in that case no longer needs to be conditioned on site for external installation, which simplifies the production of the fuel cell and saves time and costs.

An advantage of preferred single fuel cells is that they enable the operation of the fuel cell at temperatures above 120° C. This applies to gaseous and liquid fuels, for example hydrogen-comprising gases, which are prepared, for example, in an upstream reforming step from hydrocarbons. The oxidant used may, for example, be oxygen or air.

A further advantage of preferred single fuel cells is that they have a high tolerance to carbon monoxide in operation above 120° C. even with pure platinum catalysts, i.e. without a further alloy constituent. At temperatures of 160° C. for example, more than 1% CO may be present in the fuel gas without this leading to any noticeable reduction in the performance of the fuel cell.

Preferred single fuel cells can be operated in fuel cells without any need to moisten the fuel gases and the oxidants in spite of the high operating temperatures possible. The fuel cell nevertheless works stably and the membrane does not lose its conductivity. This simplifies the overall fuel cell system and brings additional cost savings since the control of the water circuit is simplified. This additionally also improves the performance at temperatures below 0° C. in the fuel cell system.

Preferred single fuel cells surprisingly allow the fuel cell, without any problem, to be cooled to room temperature and below and then put back into operation, without losing performance. Conventional phosphoric-acid-based fuel cells, in contrast, sometimes have to be kept at a temperature above 40° C. even when the fuel cell system is switched off, in order to avoid irreversible damage.

In addition, the inventive single fuel cells are notable for an improved thermal and corrosion stability and a comparatively low gas permeability especially at high temperatures. A decrease in the mechanical stability and in the structural integrity, especially at high temperatures, is avoided to the best possible degree in accordance with the invention.

Furthermore, the inventive single fuel cells can be produced inexpensively and in a simple manner.

The invention is illustrated in detail hereinafter in examples and comparative examples, without any intention that this should restrict the concept of the invention.

EXAMPLES

All examples use methods similar to that disclosed in U.S. Pat. No. 6,103,077 for fabricating the MPL or ODE.

A proton-conducting membrane produced according to the patent application EP-A-1,379,573 is used For further information on membrane electrode units, reference is made to the technical literature, in particular the patent applications WO 01/18894 A2, DE 195 09 748, DE 195 09 749, WO 00/26982, WO 92/15121 and DE 197 57 492. The disclosure contained in the above-mentioned citations with respect to the structure and production of membrane electrode units as well as the electrodes, gas diffusion layers and catalysts to be chosen is also part of the description.

Test Method for Ionic Conductivity/Proton Conductivity

Ionic/proton conductivities were measured via a four-probe through-plane bulk measurement using an AC Zahner IM6e impedance spectrometer that scanned a frequency range from 1 Hz to 100 KHz. A rectangular sample of membrane (3.5 cm×7.0 cm) was placed in a glass or polysulfone cell with four platinum wire current collectors. Two outer electrodes set 6.0 cm apart supplied current to the cell, while the two inner electrodes 2.0 cm apart on opposite sides of the membrane measured the voltage drop. To ensure a through-plane bulk measurement of the membrane ionic conductivity, the two outer electrodes are placed on opposite sides of the membrane and the two inner electrodes are arranged in the same manner. The reported conductivities were of preconditioned (dehydrated) membranes that were held at >100° C. for at least two hours. Proton conductivity was calculated using the following equation:

$$\sigma = D/(L \cdot B \cdot R)$$

Where D was the distance between the two test current electrodes, L was the thickness of the membrane, B was the width of the membrane, and R was the measured resistance. The membrane contains no additional proton-conducting fillers.

Fuel Cell testing employs 45 cm² active area single cells and standard graphite fields (Entegris-POCO graphite plates).

Cobb Titration Method (Example 0):
Equipment:
 Model 4180-C Complete Cobb sizing tester kit
 Balance—Sensitivity of 0.01 g or better
 12.5 cm×12.5 cm of test sample
 100 ml graduated cylinder
 Ethanol
 Water
 Oven
Procedure:
 Individual tests follow steps laid out by Gurley Precision Instruments.
Use of the Tester:

In advance of conditioning, cut sample to approximately 12.5×12.5 cm. After conditioning, weigh sample, place it on the Neoprene mat and clamp the appropriate (typically 100 sq. cm.) cylinder upon it by locking crossbar in place and tightening two knobs. If sample material is textured, place the gasket between the sample and cylinder, carefully aligning the inner edges of each. Pour in the test liquid (100 ml for 100 sq. cm. cylinder, proportionately less for others). Start timing the test immediately when beginning to pour the liquid.

Test duration is generally 120 seconds. More absorbent materials may be tested for shorter periods (60 seconds) while less absorbent materials may be tested for as long as eighteen hours.

At fifteen seconds before the expiration of the predetermined test period, pour the liquid quickly from the cylinder, using care in not dropping any on the untreated (outside) portion of the specimen. Promptly loosen knobs and swing crossbar out of the way while holding ring down against specimen. Quickly but carefully remove the ring and place specimen with wetted side up on a sheet of blotting paper.
Use of Roller At exactly the end of the predetermined test period, place a second sheet of blotting paper on top of the sample and remove the surplus water or other liquid by moving the hand roller once forward and once back over the pad. Care should be taken not to exert downward force on the roller. Alternative methods of blotting, such as rubbing with a cloth, are not recommended as the amount of blotting is uneven and will affect the outcome.

Fold the specimen after removing it from between the blotter sheets and reweigh to the nearest 0.01 g.

Subtract the conditioned weight of the specimen from its final weight and multiply the gain in grams by 100 to obtain the weight of liquid absorbed in grams per square meter. For the 25 or 10 sq. cm. cylinders, multiply by 400 or 1000 respectively, to obtain grams per square meter.

In order to titrate the complete hydrophobicity profile of the sample readings of several water/ethanol mixtures must be tested. Depending upon the nature of the sample initial mixtures may start anywhere between 5% and 30% ethanol. With unknown samples a good initial point is 10%. If the weight gain is minimal, 5% steps are appropriate to save time. Once moderate weight gain is seen the rest of the titration is done in 2.5% steps.

When the final weight of each step is completed the sample needs to be dried. The sample should be left in a 100° C. oven for 10 to 15 minutes. Remember, an initial weight will be needed for the next water/ethanol mixture. As the amount of ethanol increases, you may see a minor decrease in initial weight. The weight loss is due to dissolution of some PTFE by the ethanol.

Example 1

Microporous Layer

A series of microporous layers are constructed from carbon cloth (AvCarb, Lowell, Mass.), acetylene carbon black, and PTFE whereby the weight ratio of PTFE to carbon black is varied at 15%, 20%, 40%, and 55%. Carbon black+PTFE loading on the cloth are from 50-80 g/m². Onto these MPLs are coated either platinum on carbon catalyst, 10 g/m² for anode examples or platinum-alloy on carbon catalyst, 10 g total metal/m² for cathode examples.

Example 2

Cathode

A series of Cathode gas diffusion electrodes are made whereby the ratio of PTFE to carbon supported platinum alloy is varied at 15%, 20%, 40%, and 50%, and the total metal loading (platinum plus alloy metal) is 10 g/m2. Membrane Electrode Assemblies using PBI-phosphoric membranes as disclosed in U.S. Pat. No. 7,540,984 B2 are prepared whereby the final thickness is 910+/−50 microns.

Example 3

Anode

Figure 2:
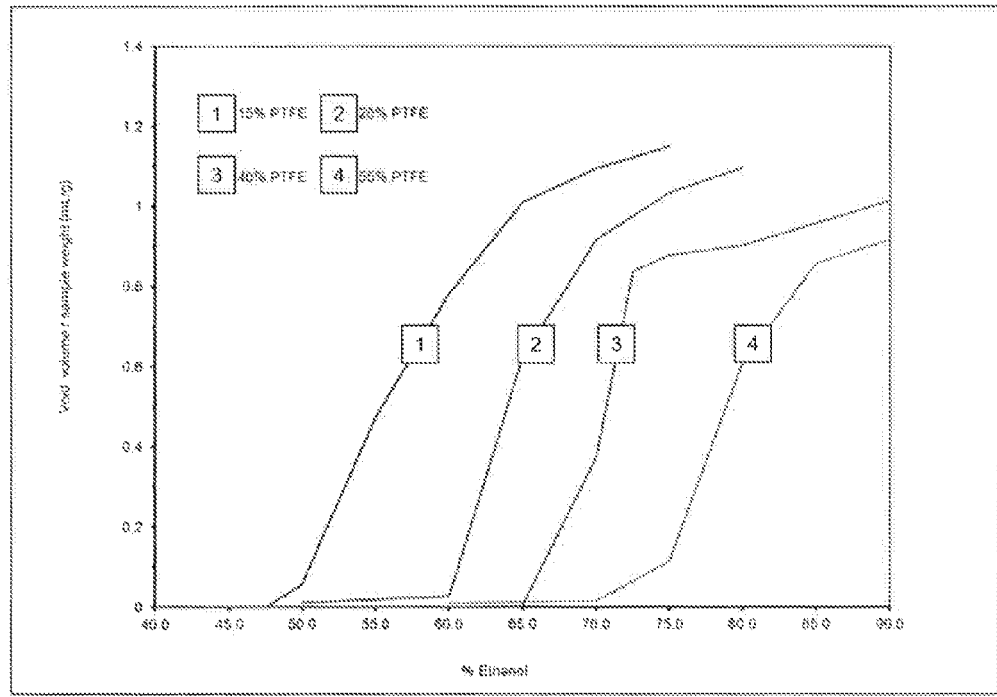
FIG. 2: Cobb Titration of MPL formed on carbon cloth substrate.
Figure 3:
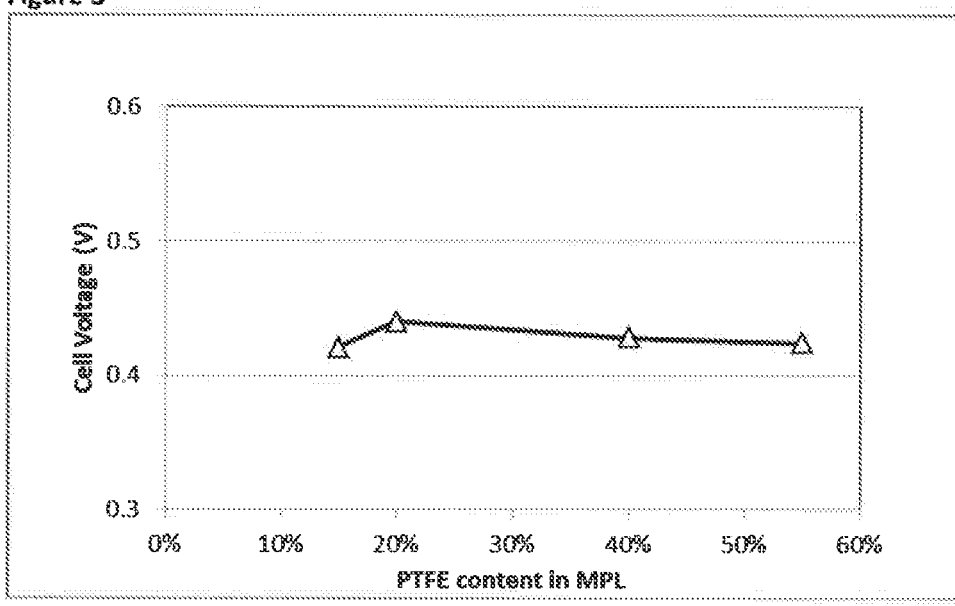
FIG. 3: Summary of Cathode fuel cell test results whereby MPL PTFE is varied from 15% to 55% by weight, operation under $H_2$/air at 160° C., voltage when operating at 1 A/cm². Stoichiometry is $H_2$ (1.2)/Air(2).
Figure 4:
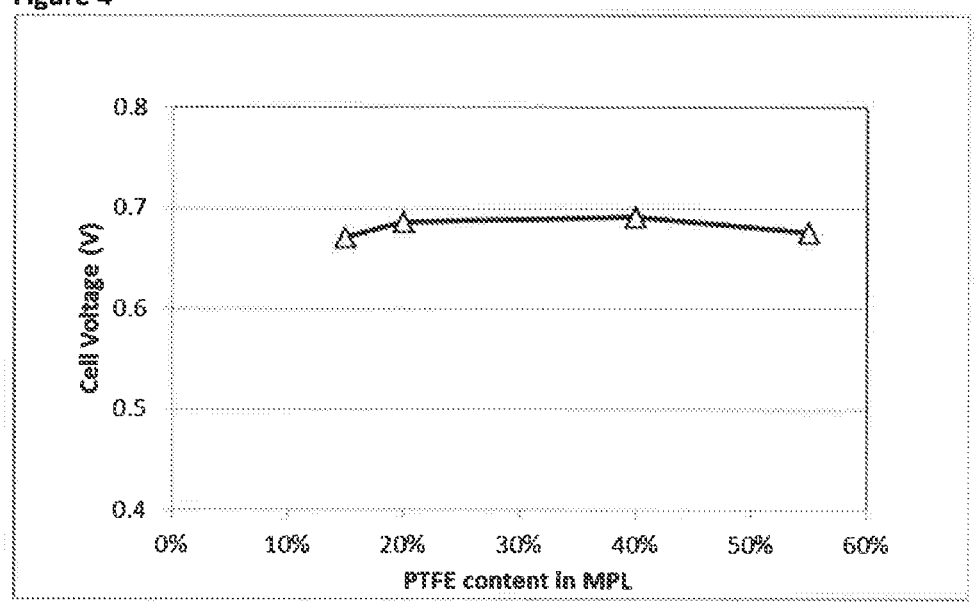
FIG. 4: Summary of Cathode fuel cell test results whereby MPL PTFE is varied from 15% to 55% by weight, operation under $H_2$/air at 160° C., voltage when operating at 0.2 A/cm². Stoichiometry is $H_2$ (1.2)/Air(2).
Figure 7:
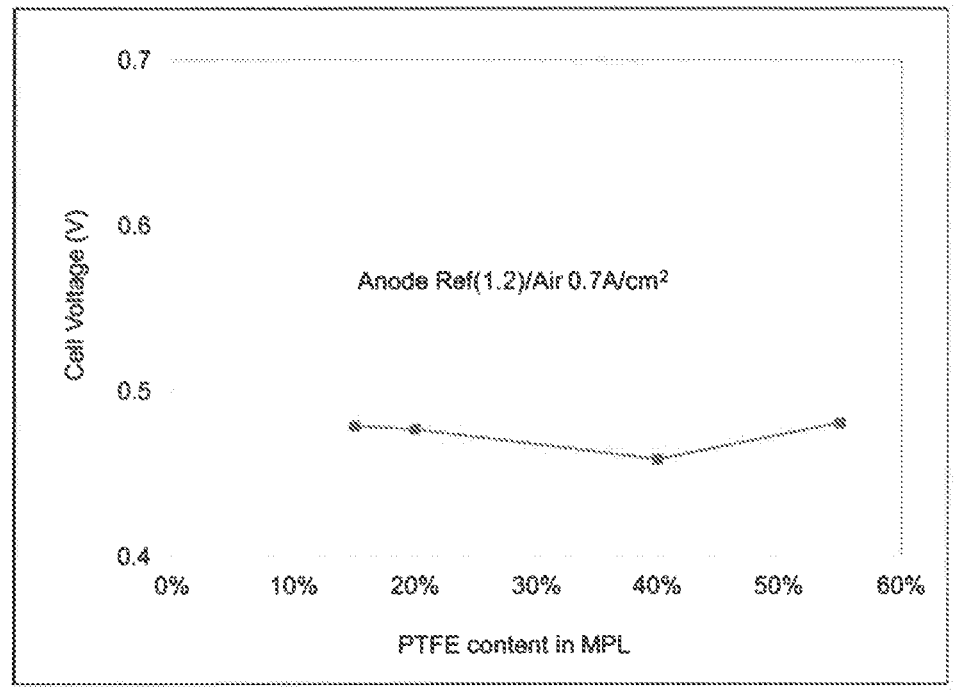
FIG. 7: Summary of Anode fuel cell test results whereby MPL PTFE is varied from 15% to 55% by weight, operation under reformate/air at 180° C., voltage when operating at 0.7 A/cm². Stoichiometry is reformate (1.2)/Air(2).
Figure 8:
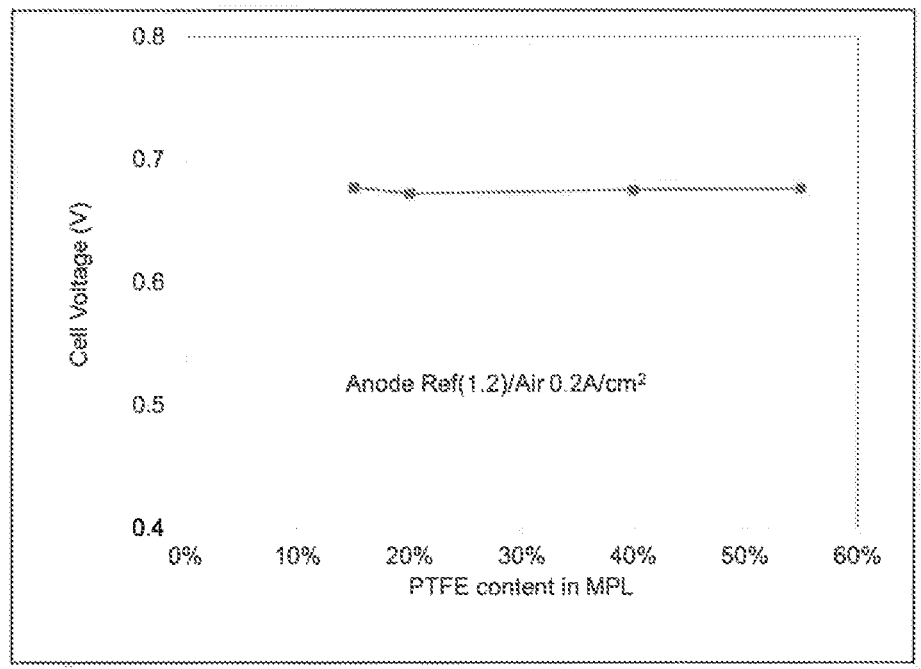
FIG. 8: Summary of Anode fuel cell test results at 0.2 A/cm² whereby MPL PTFE is varied from 15% to 55% by weight, operation under reformate/air at 180° C., voltage when operating at 0.7 A/cm². Stoichiometry is reformate (1.2)/Air(2).
Figure 11:
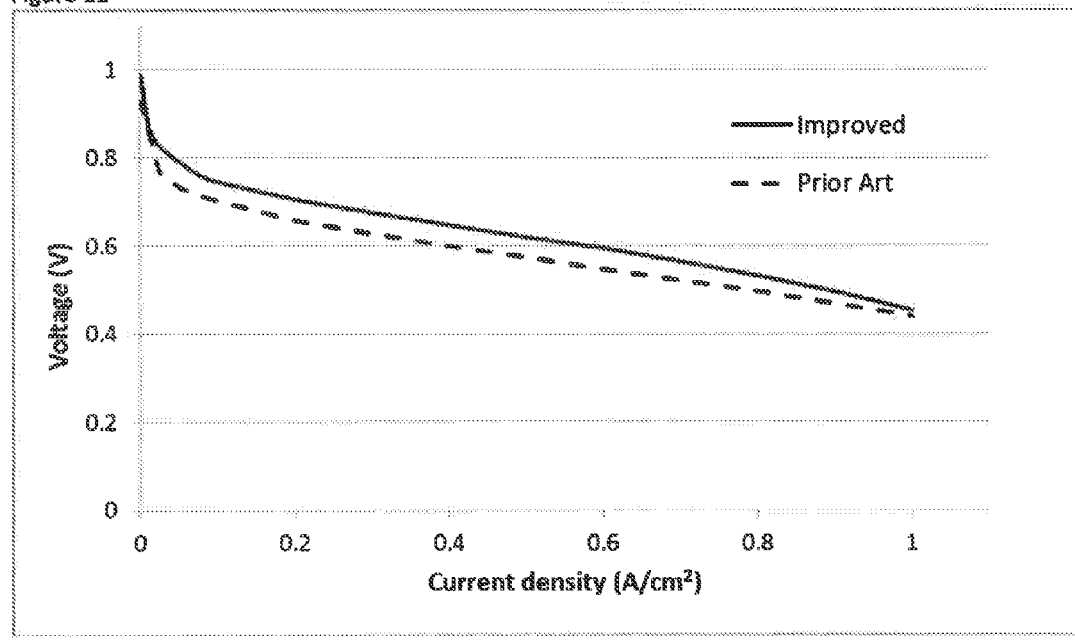
FIG. 11: Summary of improvement in Cathode fuel cell test results whereby structure of cathode and MPL are optimized based on pore volume and hydrophobicity versus prior art, operation under $H_2$/air at 160° C. Stoichiometry is $H_2$ (1.2)/Air(2).
Figure 12:
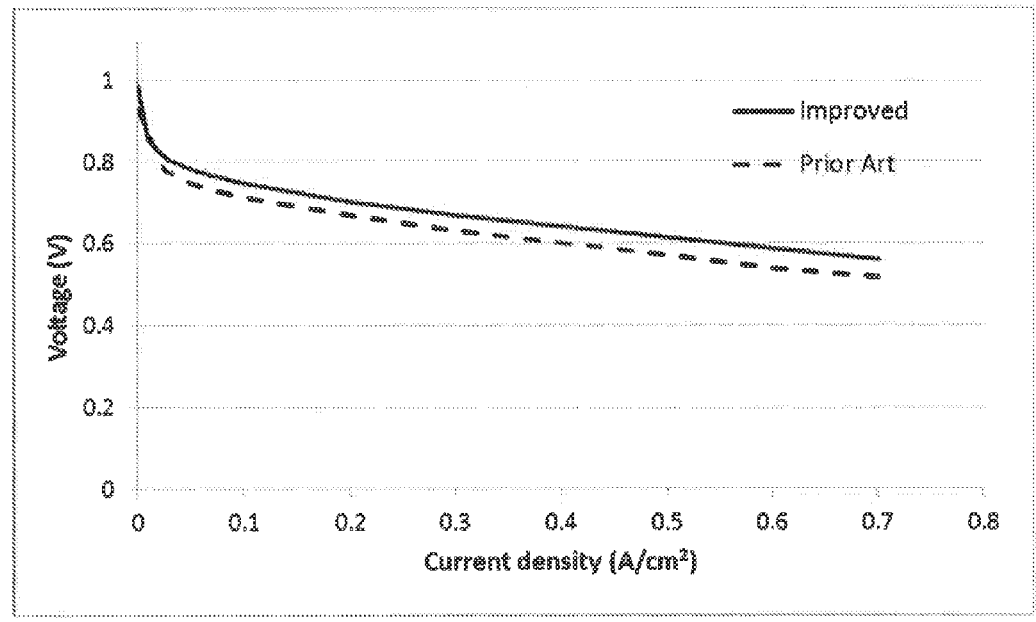
FIG. 12: Summary of improvement in Anode fuel cell test results whereby structure of anode and MPL are optimized based on pore volume and hydrophobicity versus prior art, operation under reformate/air at 180° C. Reformate is reformate=70% $H_2$, 28% $CO_2$ 2% CO. Anode is run at 1.2× stoichiometry. Cathode run at 2× stoichiometry.

A series of Anode gas diffusion electrodes are made whereby the ratio of PTFE to carbon supported platinum is varied at 15%, 20%, 25%, and 30%, and the total platinum loading is 10 g/m². Membrane Electrode Assemblies using PBI-phosphoric membranes as disclosed in U.S. Pat. No. 7,540,984 B2 are prepared whereby the final thickness is 910+/−50 microns.
Results
Microporous Layer FIG. 2 depicts the Cobb Titration data for a series of MPLs on carbon cloth. One notes that as the PTFE binder in the carbon mixture is increased, the amount of alcohol needed to wet the pores increases (greater hydrophobicity). Similarly, the void volume in the MPL decreases as shown by the last few titration points for each curve. These curves, when taken with the performance data of FIGS. 3, 4, 7 and 8 define a porosity and hydrophobicity zone. FIGS. 3 and 4 are the air performance results of the various MPLs when platinum alloy has a constant level of PTFE and tested at higher current and lower current respectively. One notes a relatively small variation of performance, with only slight decrease at the lower levels of PTFE. Similarly, when testing the MPL's porosity and hydrophobicity under reformate, a no real trend is seen as in FIGS. 7 and 8—thus concluding a wide range of fabrication conditions can be tolerated in the MPL.

Cathode

Figure 5:
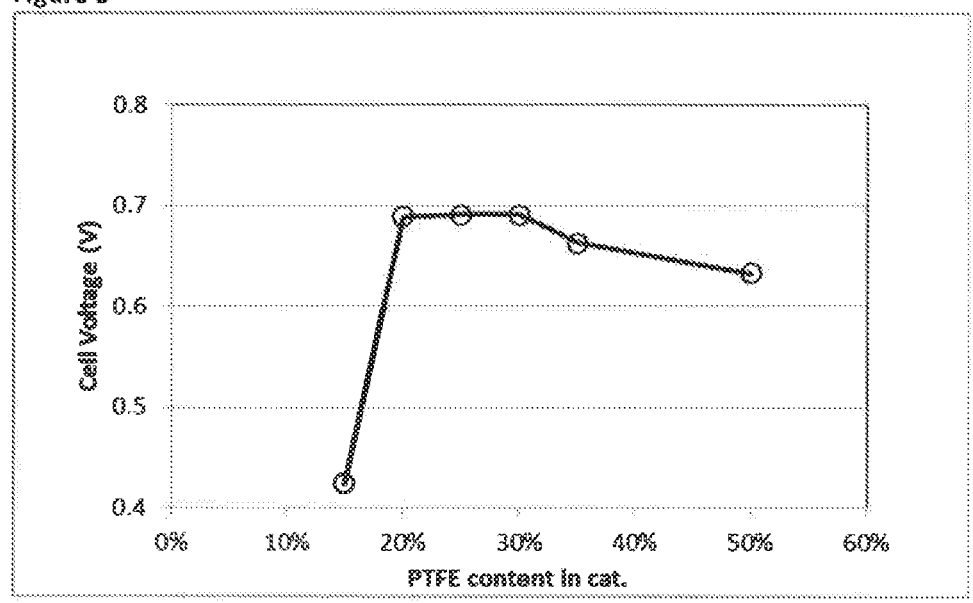
FIG. 5: Summary of Cathode fuel cell test results whereby catalyst layer PTFE is varied from 15% to 50% by weight, operation under $H_2$/air at 160° C., voltage when operating at 0.2 A/cm². Stoichiometry is $H_2$ (1.2)/Air (2).
Figure 6:
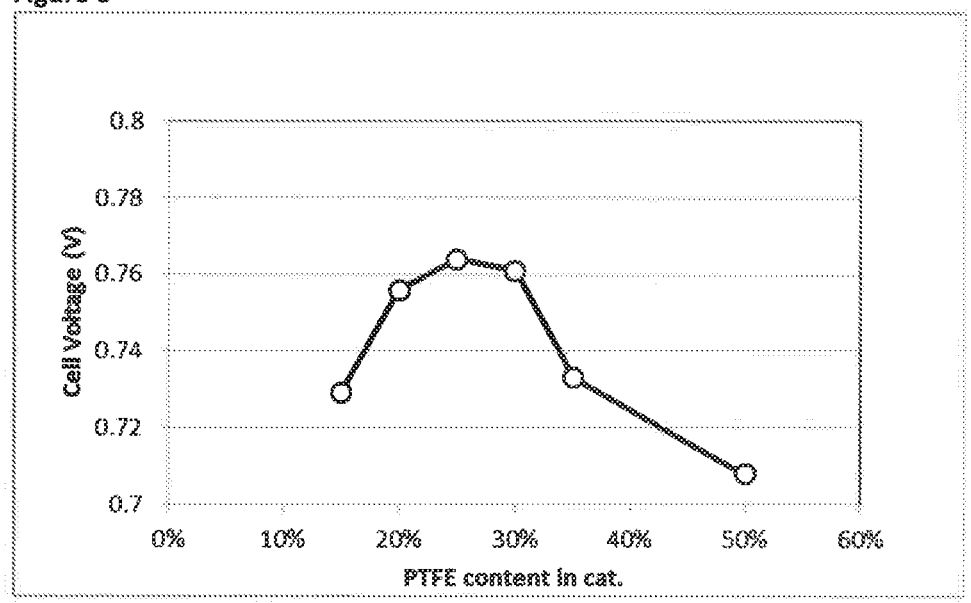
FIG. 6: Summary of Cathode fuel cell test results whereby catalyst layer PTFE is varied from 15% to 50% by weight, operation under $H_2$/$O_2$ at 160° C., voltage when operating at 0.2 A/cm². Stoichiometry is $H_2$ (1.2)/$O_2$ (9.5).

While various MPL characteristics can be tolerated for good performance due to the absence of liquid water, the catalyst layer needs a tighter range since both good gas mixing and acid wetting of the catalyst is needed. Evaluation of the air and oxygen test results for the cathode's platinum alloy catalyst when a range of porosity and hydrophobicity is created through different levels of PTFE is shown in FIGS. 5 and 6. FIG. 5 is the test in air at 0.2 A/cm$^2$, and shows the acute range of porosity and hydrophobicity that is needed, obtained in this example with 20-40% PTFE. FIG. 6 illustrates the performance in oxygen, demonstrating that a preferred range for optimum catalyst utilization occurs over a porosity of >0.05 ml/g and <0.1 ml/g, and for this set of construction materials is obtained with a PTFE content between 20% and 30%.

Anode

For anodes operating with reformate, the suite of FIGS. 9 and 10 support a total pore volume (Gas diffusion medium (substrate)+MPL+catalyst layer) being slightly less than the cathode and preferred to be 0.85 ml/g<X<1.0 ml/g and more preferably around 0.9 ml/g when the pores are within the proper hydrophobicity range, which is shown to be again of approximately under 70% ethanol:water mixtures and greater than 50% ethanol:water. These optimum characteristics can be found when the materials of construction are mixed with PTFE binder and catalyst in a range of 15-25 percent by weight.

For MPL, cathode catalyst layer, and anode catalyst layer, the amount of binder listed is not intended as a limit, that is, less than or greater than a certain amount, but more as an example of how one would obtain the critical porosity and hydrophobicity. The critical porosity and hydrophobicity can be approached when using different carbons, different alloys, and different binders, but as shown here once within the ranges specified, an optimum electrode for use with high temperature MEAs can be obtained.

The invention claimed is:

1. A membrane electrode assembly comprising
   (i) at least one phosphoric acid-containing polymer electrolyte membrane said polymer being a basic polymer and
   (ii) two gas diffusion electrodes one of each located at both sides of said membrane,
   (iii) each of the gas diffusion electrodes having at least one catalyst layer facing towards the membrane,
   (iv) at least one of said gas diffusion electrodes having said at least one catalyst layer facing towards the membrane consists of:
       (a) at least one gas diffusion medium comprising an electrically conductive macroporous layer in which the pores have a mean pore diameter in the range from 10 μm to 30 μm,
       (b) at least one micro porous layer arranged between said gas diffusion medium and said catalyst layer facing towards the membrane,
   (v) said microporous layer (MPL) and said gas diffusion medium suitable as a base for either anode or cathode catalyst layers, having:
       (a) a pore void volume range of between 0.8 mL/g and 1.6 mL/g and
       (b) a pore hydrophobicity measured by a Cobb Titration test between 60% Ethanol:Water and 80% Ethanol:Water,
   (vi) a cathode gas diffusion electrode as defined in (iv) consisting of said gas diffusion medium, microporous layer and catalyst layer having:
       (a) a pore void volume of X, whereby 0.8 mL/g<X<1.0 mL/g/total pore volume
       (b) a pore hydrophobicity measured by the Cobb Titration test between 60% Ethanol:Water and 80% Ethanol:Water
   (vii) a cathode catalyst layer of (vi) as defined in (iv) having:
       (a) a pore void volume of X, whereby 0.05 mL/g<X<0.10 mL/g/total pore volume and
       (b) a pore hydrophobicity measured by the Cobb Titration test between 50% Ethanol:Water and 70% Ethanol:Water,
   (viii) an anode gas diffusion electrode as defined in (iv) consisting of said gas diffusion medium, microporous layer and catalyst layer having:
       (a) a pore void volume of X, whereby 0.85 mL/g<X<1.0 mL/g/total pore volume and
       (b) a pore hydrophobicity measured by the Cobb Titration test between 50% Ethanol:Water and 70% Ethanol:Water and:
   (ix) an anode catalyst layer of (viii) as defined in (iv) having:
       (a) a pore void volume of X, whereby 0.05 mL/g<X<0.10 mL/g/total pore volume and
       (b) a pore hydrophobicity measured by the Cobb Titration test between 50% Ethanol:Water and 70% Ethanol:Water.

2. The membrane electrode assembly as claimed in claim 1, wherein the polymer electrolyte membrane provides a proton conductivity of the membrane without humidification of at least 100 mS/cm at 160° C.

3. The membrane electrode assembly as claimed in claim 1, wherein the polymer electrolyte membrane comprises said basic polymer having at least a nitrogen atom in the repeat unit of the polymer.

4. The membrane electrode assembly as claimed in claim 1, wherein the polymer electrolyte membrane comprises at least one basic polymer having an aromatic ring having at least one nitrogen atom in the repeat unit of the polymer.

5. The membrane electrode assembly as claimed in claim 4, wherein the aromatic ring is a five- or six-membered ring having one to three nitrogen atoms, which may be fused to another ring.

6. The membrane electrode assembly as claimed in claim 1, wherein the micro porous layer is a part of the gas diffusion medium facing towards the catalyst layer.

7. The membrane electrode assembly as claimed in claim 1, wherein the gas diffusion medium has a thickness in the range from 80 μm to 2000 μm.

8. The membrane electrode assembly as claimed in claim 1, wherein the gas diffusion medium has a conductivity (through-plane resistivity) of <10mOhmcm$^2$ as measured per ASTM C-611.

9. The membrane electrode assembly as claimed in claim 1, wherein the gas diffusion medium has a basis weight of 90-120 g/m$^2$ for cloth substrates and a basis weight of 30-100 g/m$^2$ for paper substrates.

10. The membrane electrode assembly as claimed in claim 1, wherein the micro porous layer has a thickness in the range from 25 μm to 100 μm.

11. The membrane electrode assembly as claimed in claim 1, wherein the mean pore diameter in the micro porous layer ranges from 10 μm to 30 μm.

12. The membrane electrode assembly as claimed in claim 1, wherein the total amount of hydrophobic, fluorine containing, binder in the micro porous layer ranges from 15% by weight to 50% by weight whereby this percentage is measured as a fraction of binder weight to total binder plus carbon black weight.

13. The membrane electrode assembly as claimed in claim 1, wherein the macroporous layer comprises carbon black particles, with a particle size less than 100 nm.

14. A fuel cell comprising at least one membrane electrode assembly according to claim 1.

15. The membrane electrode assembly as claimed in claim 1, wherein the gas diffusion medium has a conductivity (through-plane resistivity) of <15mOhmcm$^2$ when coated with a micro porous layer as measured per ASTM C-611.

* * * * *